(12) United States Patent
Scalici

(10) Patent No.: US 10,808,842 B2
(45) Date of Patent: Oct. 20, 2020

(54) PARK-LOCK DEVICE FOR A VEHICLE TRANSMISSION

(71) Applicant: Dana Graziano S.R.L., Rivoli (Torino) (IT)

(72) Inventor: Giorgio Scalici, Alessandria (IT)

(73) Assignee: Dana Graziano S.R.L., Frazione Cascine Vica (IT)

(*) Notice: Subject to any disclaimer, the term of this patent is extended or adjusted under 35 U.S.C. 154(b) by 149 days.

(21) Appl. No.: 16/030,339

(22) Filed: Jul. 9, 2018

(65) Prior Publication Data

US 2019/0017598 A1    Jan. 17, 2019

(30) Foreign Application Priority Data

Jul. 13, 2017 (IT) .......................... 102017000079002

(51) Int. Cl.
*F16H 63/34* (2006.01)
*B60T 1/00* (2006.01)

(52) U.S. Cl.
CPC .......... *F16H 63/3425* (2013.01); *B60T 1/005* (2013.01); *F16H 63/3466* (2013.01); *F16H 63/3416* (2013.01)

(58) Field of Classification Search
CPC ... F16H 63/3416–3433; F16H 63/3466; F16H 63/3458
See application file for complete search history.

(56) References Cited

U.S. PATENT DOCUMENTS

| 4,369,867 A | 1/1983 | Lemieux |
| 5,630,339 A * | 5/1997 | Tuday ..................... B60T 1/005 192/219.5 |
| 2009/0173594 A1* | 7/2009 | Joshi ................... F16H 63/3416 192/219.5 |
| 2012/0285755 A1* | 11/2012 | Keller ..................... B60T 1/062 180/65.1 |

(Continued)

FOREIGN PATENT DOCUMENTS

| EP | 0891902 A1 | 1/1999 |
| EP | 2657578 A2 | 10/2013 |
| FR | 2077195 A1 | 10/1971 |

OTHER PUBLICATIONS

Italian Search Report, Italian Patent Application No. 102017000079002, dated Mar. 5, 2018.

*Primary Examiner* — Ernesto A Suarez
*Assistant Examiner* — Lillian T Nguyen
(74) *Attorney, Agent, or Firm* — Marshall & Melhorn, LLC

(57) ABSTRACT

A park-lock device having a gearwheel connected to a rotating member; a tilting lever with a locking tooth engagable with the gearwheel to prevent rotation thereof, the tilting lever is tiltable about a first axis of rotation between a disengagement and engagement position; and a spring that applies torque on the cam. The cam is mounted about a second axis of rotation parallel to the first axis of rotation and has a first lateral surface portion that cooperates with a first cam follower of the tilting lever. The tilting lever has a second cam follower and the cam has a second lateral surface portion that cooperates with the second cam follower. In a first rotational direction the cam causes the tilting lever to tilt from the disengagement to the engagement position. In a second direction the cam causes the tilting (Continued)

lever to tilt from the engagement to the disengagement position.

20 Claims, 5 Drawing Sheets

(56) References Cited

U.S. PATENT DOCUMENTS

2015/0267811 A1* 9/2015 Kristofcsak ......... F16H 63/3433
  192/219.5
2018/0023650 A1* 1/2018 Spaulding ............... B60T 1/005
  192/219.5

* cited by examiner

PARK-LOCK DEVICE FOR A VEHICLE TRANSMISSION

CROSS-REFERENCE TO RELATED APPLICATIONS

The present invention claims priority to Italian Patent Application No. 102017000079002 filed on Jul. 13, 2017.

BACKGROUND OF THE INVENTION

The present invention relates to a park-lock device for a vehicle transmission, that is to say, a rotation preventing device arranged to prevent rotation of a transmission shaft of the vehicle when the vehicle is parked.

A park-lock device of the above-identified type is known for example from U.S. Pat. No. 4,369,867. According to this known solution, the park-lock device comprises a gearwheel, or parking wheel, and a tilting lever provided with a locking tooth adapted to engage the space between two adjacent teeth of the gearwheel to prevent rotation of the gearwheel. The gearwheel is drivingly connected for rotation with a rotating member of the vehicle transmission, in the present case the casing of the differential gear. The tilting lever is mounted so as to be tiltable between a disengagement position, wherein the locking tooth does not mesh with the teeth of the gearwheel, and therefore the gearwheel, along with the casing of the differential gear, is free to rotate, and an engagement position, wherein the locking tooth meshes with the teeth of the gearwheel, thereby preventing rotation of the gearwheel, as well as of the casing of the differential gear, and therefore preventing movement of the vehicle in either driving direction (parking position of the vehicle). The tilting lever is normally held by a spring in the disengagement position and is moved from the disengagement position to the engagement position by an actuation member acting on the tilting lever through a cam. A roller acting as cam follower is carried by the tilting lever and is held in contact against the lateral surface of the cam.

SUMMARY OF THE INVENTION

It is an object of the present invention to provide a park-lock device for a vehicle transmission which has an axially compact structure, does not require the use of springs to move the tilting lever to the disengagement position and allows to reduce the force that has to be applied to cause rotation of the cam.

This and other objects are fully achieved according to the present invention by virtue of a park-lock device wherein the tilting lever is provided with two cam followers, each cooperating with a respective portion of the lateral surface of the cam, so that the cam operates as a double-acting cam, so that in a first direction of rotation it causes the tilting lever to tilt from the disengagement position to the engagement position, whereas in a second direction of rotation opposite to the first one it causes the tilting lever to tilt from the engagement position to the disengagement position. The park-lock device according to the invention further comprises a drive shaft on which the cam is mounted with angular clearance, a rotary actuator for driving the rotation of the drive shaft in either direction, and a spring adapted to apply an elastic torque on the cam about the axis of rotation of the latter.

The use of a double-acting cam to control the tilting movement of the tilting lever both towards the engagement position and towards the disengagement position, makes it possible to avoid the need for springs to hold the tilting lever in the disengagement position. Moreover, the use of a double-acting cam allows to reduce the release force, without the risk that the tilting lever may remain locked in the engagement position due to the contact forces between the locking tooth and the gearwheel. It is thus possible to reduce the force required to cause rotation of the cam.

According to an embodiment, the spring is connected at an end thereof to the cam and at an opposite end to the drive shaft so as to apply on the cam an elastic torque tending to cause rotation of the cam in the above-mentioned first direction of rotation. The spring is preferably connected, on the side facing the drive shaft, to an abutment member which is made as a piece separate from the drive shaft and is rigidly connected to the latter, for example by spline coupling.

According to an alternative embodiment, the spring is connected at an end thereof to the cam and at an opposite end to a fixed part of the transmission, for example the casing of the gearbox.

BRIEF DESCRIPTION OF THE DRAWINGS

Further features and advantages of the present invention will become apparent from the following detailed description, given purely by way of non-limiting example with reference to the appended drawings, wherein.

DETAILED DESCRIPTION OF EMBODIMENTS OF THE INVENTION

Figure 1:
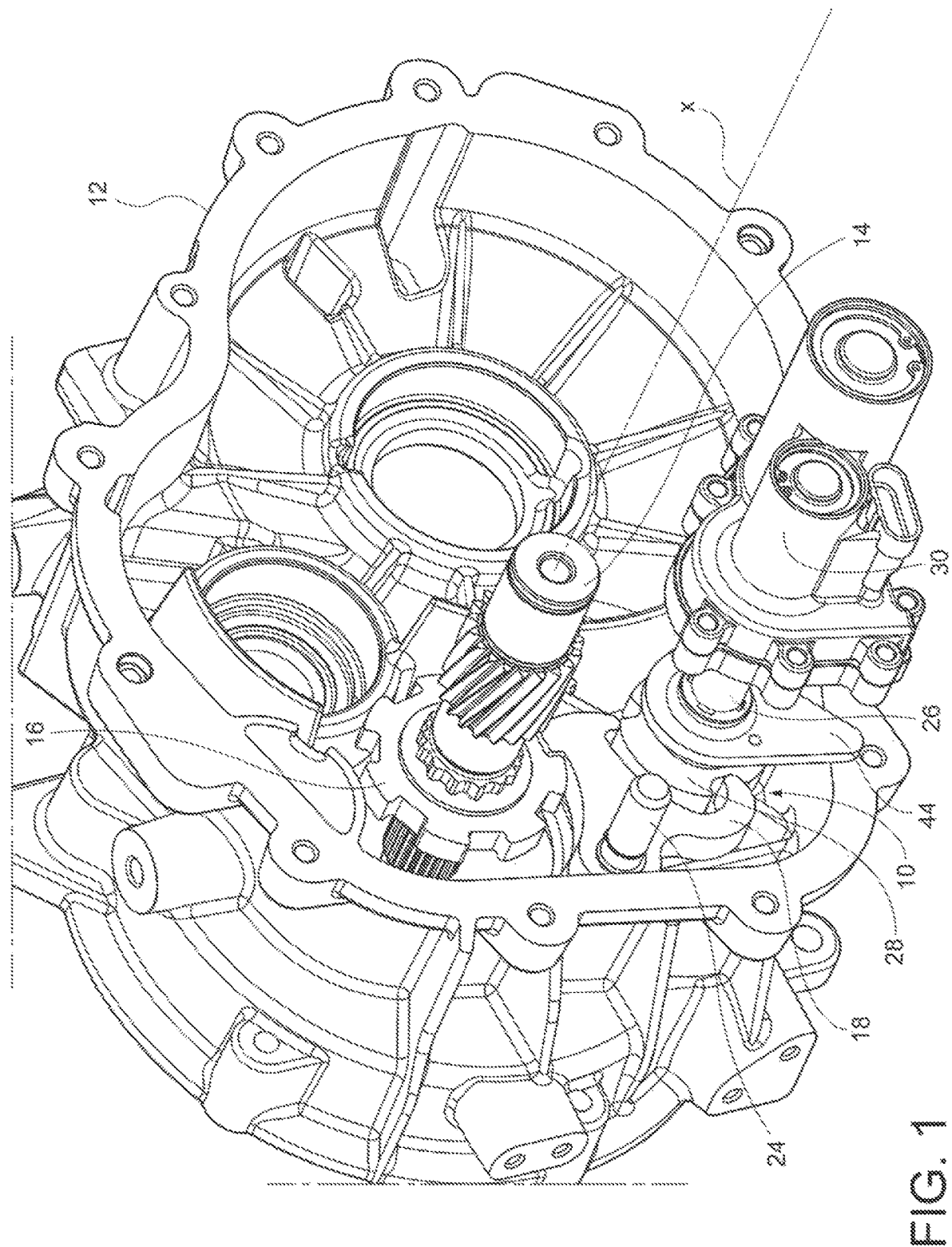
FIG. 1 is a perspective view showing part of a vehicle transmission on which a park-lock device according to an embodiment of the present invention is installed.

With reference first to FIG. 1, a park-lock device 10 for a vehicle transmission according to the present invention. The park-lock device 10 is received inside a gearbox casing 12 of the transmission and is arranged to prevent the rotation of a secondary shaft 14 of the transmission, or alternatively of any other rotating member of the transmission which is non-releasably connected to the vehicle wheels, when the vehicle must be held stationary in a parking position. The secondary shaft 14 is rotatably supported, in per-se-known manner, by the gearbox casing 12 for rotation about its longitudinal axis (indicated x).

The park-lock device 10 comprises first of all a gearwheel 16, or parking wheel, which is drivingly connected for rotation with the secondary shaft 14, and a tilting lever 18 which is provided with a locking tooth 20 arranged to prevent rotation of the gearwheel 16 by engaging the free space between two adjacent teeth 22 of the gearwheel 16. The tilting lever 18 is supported, for example on a rod 24 extending with its longitudinal axis (indicated x1) parallel to the longitudinal axis x of the secondary shaft 14 (coinciding with the axis of rotation of the gearwheel 16), so as to be tiltable about an axis of rotation (coinciding with the longitudinal axis x1 of the rod 24) between a disengagement position (FIG. 4a), wherein the locking tooth 20 does not mesh with the teeth 22 of the gearwheel 16, and therefore the gearwheel 16, along with the secondary shaft 14, is free to rotate about the axis x, and an engagement position (FIG. 4d), wherein the locking tooth 20 meshes with the teeth 22 of the gearwheel 16, thereby preventing rotation of the gearwheel 16, as well as of the secondary shaft 14, about the axis x, and hence preventing movement of the vehicle in either driving direction (parking position of the vehicle).

Figure 2:
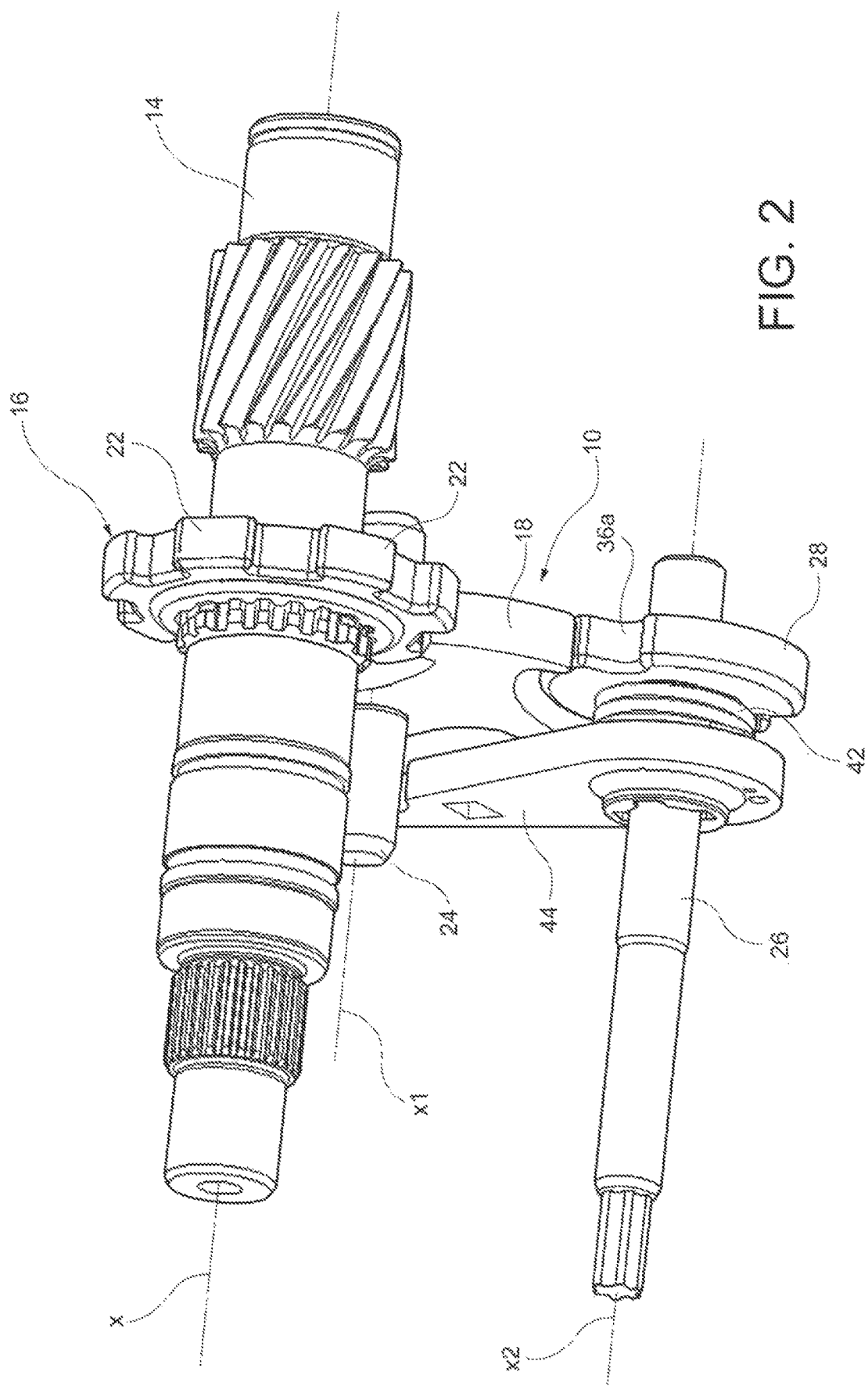
FIG. 2 is a perspective view of a park-lock device according to an embodiment of the present invention.
Figure 3:
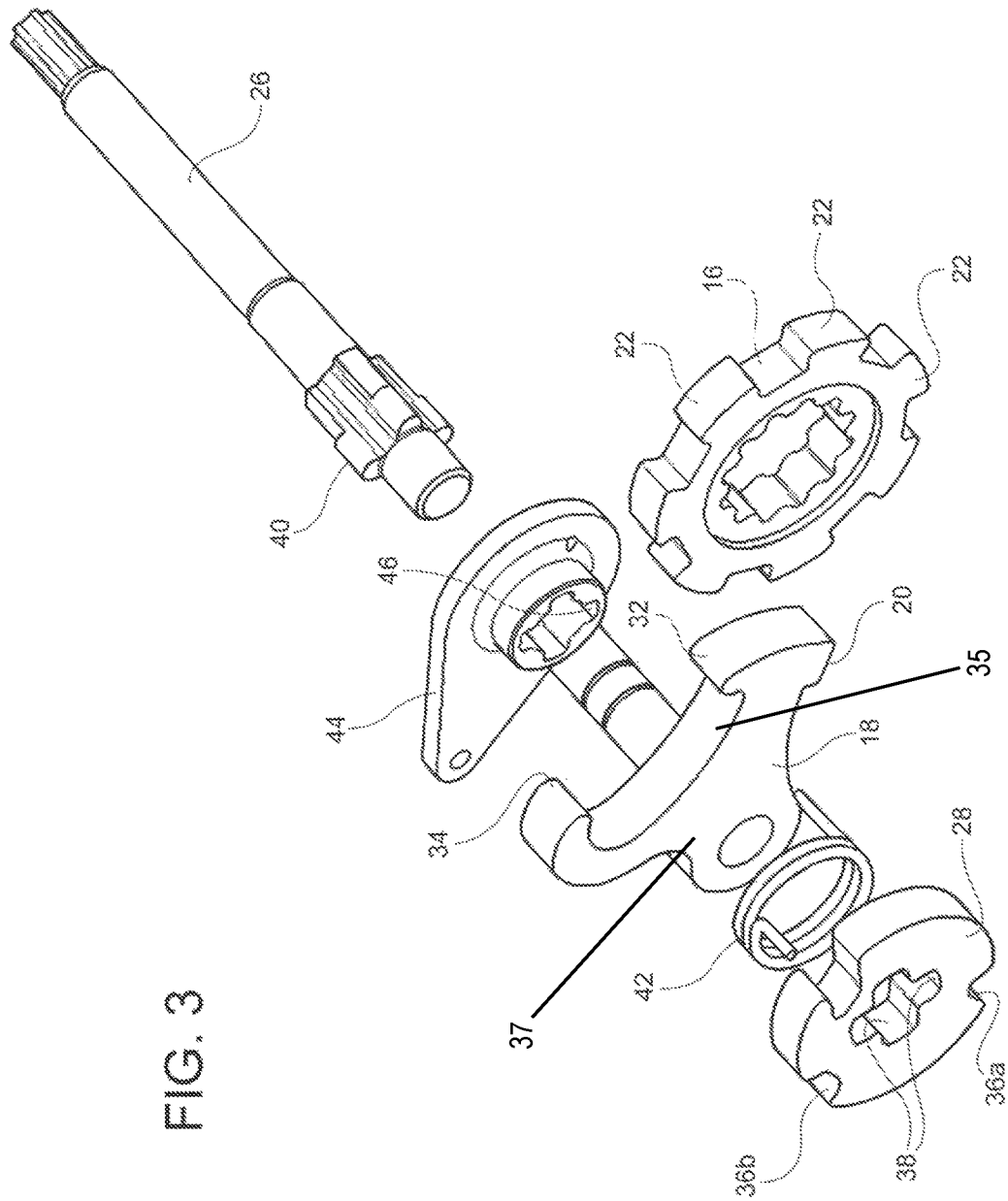
FIG. 3 is an exploded view of the park-lock device of FIG. 2.
Figure 4:
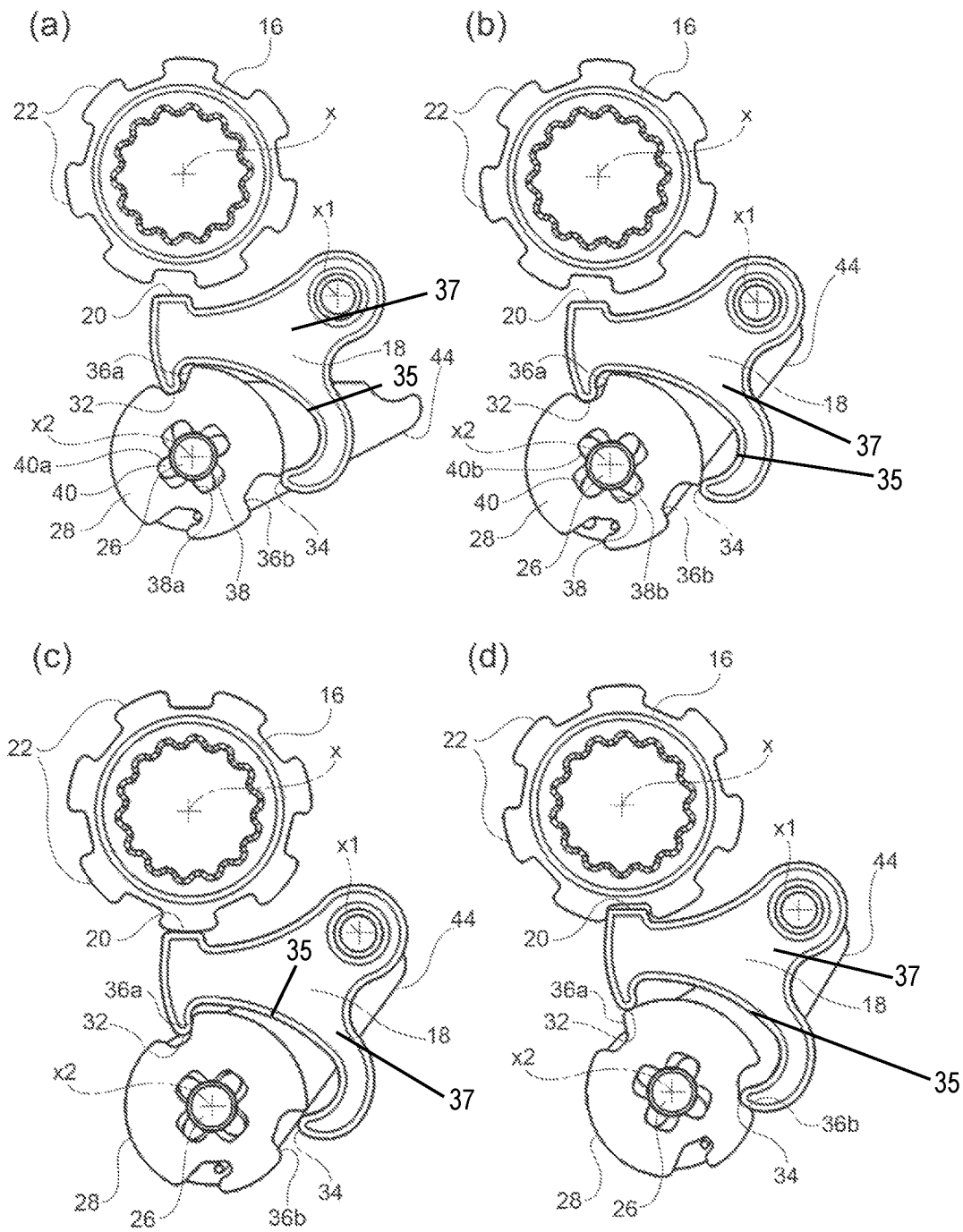
FIG. 4 is a front view of the park-lock device of FIG. 2, showing one after the other some of the positions taken by the device when the tilting lever is moved from the disengagement position to the engagement position.

With reference also to FIGS. 2 to 4, the park-lock device 10 further comprises a control unit for controlling the tilting movement of the tilting lever 18 about its axis of rotation x1 in either direction between the aforementioned disengagement and engagement positions. The control unit basically comprises a drive shaft 26 which is rotatably mounted about an axis of rotation x2 coinciding with its longitudinal axis and extending parallel to the axes x and x1, a cam 28 carried by the drive shaft 26 and a rotary actuator 30, for example an electric actuator, for controlling rotation of the drive shaft 26, and hence of the cam 28 therewith, in either direction.

The cam 28 and the tilting lever 18 are made as flat elements and are arranged in the same plane as that of the gearwheel 16.

The tilting lever 18 is provided with a first cam follower 32 and a second cam follower 34 which are angularly spaced from one another about the axis of rotation x1 of the tilting lever 18 and cooperates with a first lateral surface portion 36a and with a second lateral surface portion 36b of the cam 28, respectively. The cam 28 operates therefore as a double-acting cam, in that in a first direction of rotation (counter-clockwise direction, with respect to the point of view of a person looking at FIG. 4) it causes the tilting lever 18 to tilt in the direction from the disengagement position to the engagement position (as shown in sequence from FIG. 4a to FIG. 4d) due to the interaction of the first lateral surface portion 36a with the first cam follower 32, while in a second direction of rotation opposite to the first one it causes the tilting lever 18 to tilt in the direction from the engagement position to the disengagement position due to the interaction of the second lateral surface portion 36b with the second cam follower 34.

Figure 5:
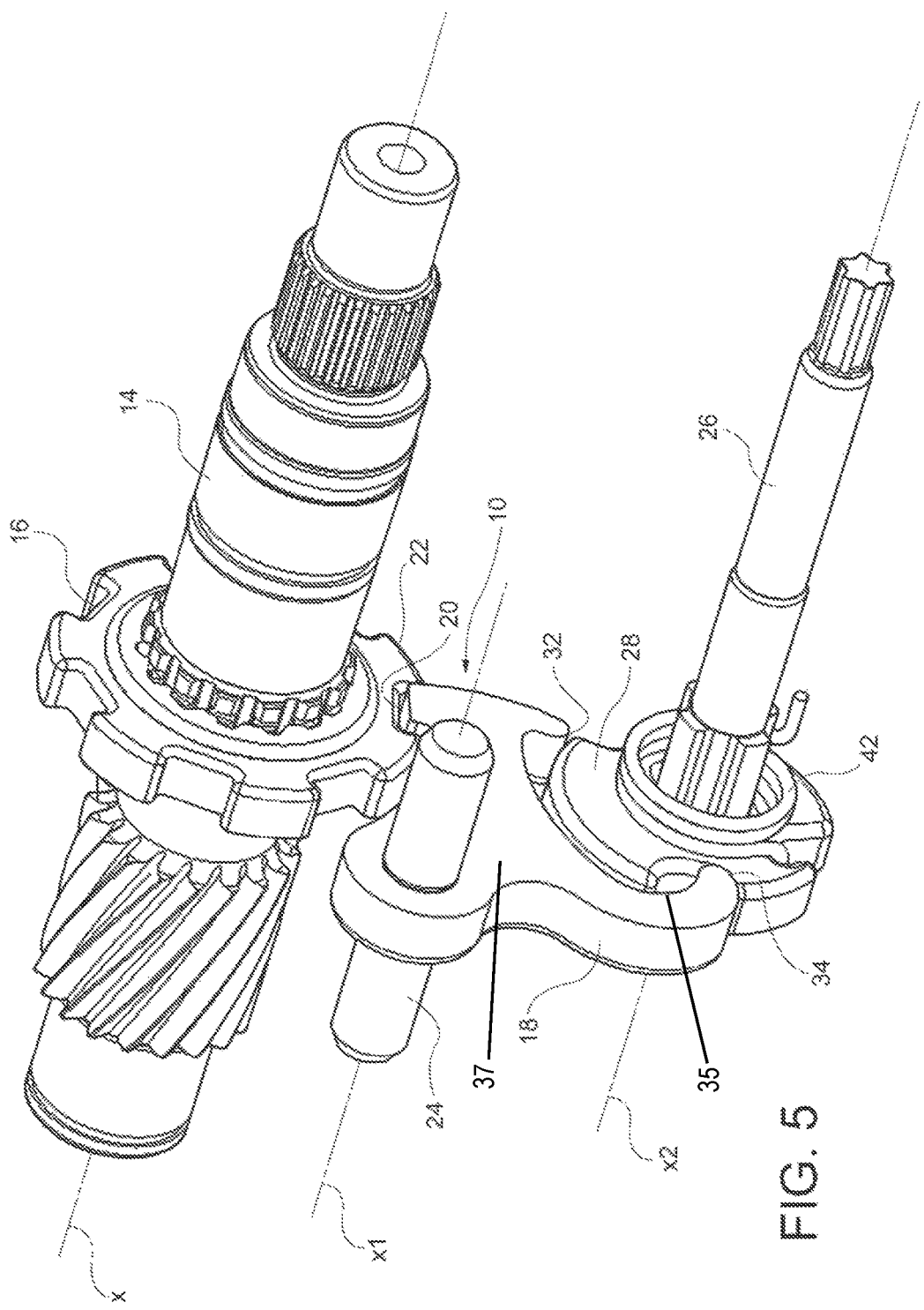
FIG. 5 is a perspective view of a park-lock device according to a further embodiment of the present invention.

As illustrated in FIGS. 3-5 of the disclosure and as a non-limiting example, the tilting lever 18 may include one or more cam receiving portions 35 extending inward into a body portion 37 thereof. The one or more cam receiving portions 35 may be of a size and shape to receive and/or retain at least a portion of the cam 28 therein.

The cam 28 is mounted with angular clearance on the drive shaft 26, as shown in FIG. 4. To this end, the cam 28 has for example a plurality of internal radial cavities 38 in each of which a respective radial protrusion 40 of the drive shaft 26 engages with clearance, in that the circumferential size (width) of the radial cavities 38 is smaller than that of the radial protrusions 40.

A spring 42, made for example as a cylindrical helical flexion spring, is interposed between the cam 28 and the drive shaft 26. The spring 42 is connected at a first end thereof to the cam 28 and at an opposite end thereof to the drive shaft 26 so as to apply on the cam 28 an elastic torque tending to make the cam 28 rotate in the aforesaid first direction of rotation, i.e. in the direction causing the tilting lever 18 to shift from the disengagement position to the engagement position. Preferably, as in the embodiment shown in the drawings, the spring 42 is connected, on the side facing the drive shaft 26, to an abutment member 44 which is made as a piece separate from the drive shaft 26 and is rigidly connected to the latter, for example by spline coupling 46, so as to be rotatable as one piece with the drive shaft 26 about the axis of rotation x2.

The park-lock device 10 may also comprise a position sensor for detecting the angular position of the drive shaft 26 or of the abutment member 44 about the axis of rotation x2, in order to allow position-feedback control of the rotary actuator 30.

The operation of the park-lock device 10, and more in particular of its control unit, will be described now with reference to the case wherein the tilting lever 18 is moved from the disengagement position to the engagement position, as illustrated in the various conditions indicated with a), b), c) and d) in FIG. 4.

In the condition a) the tilting lever 18 is in the disengagement position, that is, the locking tooth 20 does not mesh with the teeth 22 of the gearwheel 16. The tilting lever 18 is held in this position as a result of the contact between its second cam follower 34 and the second lateral surface portion 36b of the cam 28. The tilting lever 18 is therefore prevented from rotating about its axis of rotation x1 towards the engagement position (i.e. in the clockwise direction, with respect to the point of view of a person looking at FIG. 4) insofar as the cam 28 remains in the position of FIG. 4a. As the drive shaft 26 does not rotate, the cam 28 is held in the above-mentioned position by virtue of the preload of the spring 42 acting between the cam 28 and the drive shaft 26. Such a preload tends, in fact, to cause the cam 28 to rotate in counter-clockwise direction relative to the drive shaft 26, and hence to keep first flanks 38a of the radial cavities 38 of the cam 28 in abutment against corresponding first flanks 40a of the radial protrusions 40 of the drive shaft 26.

If, starting from such a condition, the drive shaft 26 is rotated in the first direction of rotation (counter-clockwise direction) about the axis of rotation x2 up to an angle equal to the angular clearance between the drive shaft 26 and the cam 28, first—see the condition indicated b)—such a movement does only lead to a further elastic deformation of the spring 42, without therefore causing rotation of the cam 28, due to dynamic effects or to tooth-to-tooth contacts.

At this point, without the drive shaft 26 being further rotated in the first direction of rotation about the axis of rotation x2, the elastic torque applied by the spring 42 onto the cam 28 tends to make the cam 28 rotate in the first direction of rotation relative to the drive shaft 26 and therefore, as a result of the interaction of the first lateral surface portion 36a of the cam 28 with the first cam follower 32 of the tilting lever 18, to make the tilting lever 18 rotate about the axis of rotation x1 towards the engagement position—condition c)—and finally reach the engagement position when, upon rotation of the gearwheel 16, the locking tooth 20 of the tilting lever 18 is facing the free space between two adjacent teeth 22 of the gearwheel 16—condition d).

The cam 28 is now held by the spring 42 in the position thus reached and, due to the engagement of the first cam follower 32 of the tilting lever 18 with a length of the first lateral surface portion 36a of the cam 28 having a larger diameter, rotation of the tilting lever 18 in the direction from the engagement position to the disengagement position is prevented. The park-lock device 10 is thus irreversible, as it cannot release autonomously due to the contact forces exchanged between the gearwheel 16 and the tilting lever 18.

Movement of the tilting lever 18 back from the engagement position to the disengagement position can only occur upon rotation of the drive shaft 26, and hence of the cam 28 therewith, in the opposite direction (clockwise direction, with respect to a person looking at FIG. 4), thanks to the interaction of the second cam follower 34 of the tilting lever 18 with the second lateral surface portion 36b of the cam 28. When the tilting lever 18 is in the disengagement position, thanks to the configuration of the cam 28 as a double-acting cam the tilting lever 18 is not allowed to move towards the engagement position due to the contact forces acting between the components of the device, and therefore there is no need of a special spring to hold the tilting lever 18 in that position.

Finally, FIG. 5 shows a further embodiment of a park-lock device for a vehicle transmission according to the present invention. With reference to FIG. 5, where parts and elements of the park-lock device identical or corresponding to those of the park-lock device of FIGS. 1 to 4 have been indicated with the same reference numerals, the park-lock device according to this further embodiment differs from the one illustrated in FIGS. 1 to 4 in that it does not comprise the abutment member 44 and therefore the spring 42 is connected, at the end thereof opposite to the one connected to the cam 28, to the gearbox casing 12. Apart from that, what has already been stated above in connection with the embodiment of FIGS. 1-4 still applies. By virtue of such an arrangement of the spring 42, the park-lock device of this further embodiment is self-engaging.

As is evident from the above description, as well as from the attached drawings, the park-lock device of the present invention provides first of all the advantage of having a structure which is axially very compact, since the tilting lever and the cam are flat elements and are mounted in the same plane as that of the gearwheel.

Moreover, thanks to the use of a double-acting cam the tilting lever is held in the disengagement position without the need for a special retaining spring, which is instead required in the park-lock devices according to the prior art.

Furthermore, the use of a double-acting cam allows to reduce, with respect to the prior art, the release force, i.e. the force required to move the tilting lever from the engagement position to the disengagement position, without the risk that the tilting lever be held in the engagement position due to the contact forces exchanged with the gearwheel.

Naturally, the principle of the invention remaining unchanged, the embodiments and the constructional details may vary widely from those described and illustrated purely by way of non-limiting example, without thereby departing from the scope of the invention as defined in the appended claims.

What is claimed is:

1. A park-lock device for a vehicle transmission, comprising
    a gearwheel connected for rotation with a rotating member;
    a tilting lever comprising a first cam follower, a second cam follower, and a locking tooth selectively engagable with the gearwheel to prevent rotation of the gearwheel;
        wherein the tilting lever is tiltably mounted about a first axis of rotation allowing the tilting lever to tilt between a disengagement position and an engagement position;
    a shaft rotatably mounted about a second axis of rotation;
    a rotary actuator for controlling rotation of the shaft;
    a cam mounted on the shaft for rotation therewith;
        wherein in a first rotational direction the cam causes the tilting lever to transition from the disengagement position to the engagement position;
        wherein in a second rotational direction, opposite to the first rotational direction, the cam causes the tilting lever to transition from the engagement position to the disengagement position;
        wherein at least a portion of the first cam follower of the tilting lever is selectively received and/or retained within at least a portion of a first tilting lever receiving portion in a body portion of the cam; and
        wherein at least a portion of the second cam follower of the tilting lever is selectively received and/or retained within at least a portion of a second tilting lever receiving portion in the body portion of the cam.

2. The park-lock device of claim 1, further comprising a spring, wherein at least a portion of one end of the spring is connected to the cam and at least a portion of an opposite end of the spring is connected to the shaft to selectively apply on the cam an amount of torque to selectively drive the cam to rotate.

3. The park-lock device of claim 1, further comprising a spring, wherein at least a portion of an end of the spring is connected to the cam and at least a portion of an opposite end of the spring is connected to a fixed part of the transmission.

4. The park-lock device of claim 1, wherein the tilting lever and the cam are substantially flat elements that are arranged along the same plane as the gearwheel.

5. The park-lock device of claim 1, further comprising a gearbox casing; and
    wherein at least a portion of the park-lock device is disposed within the gearbox casing.

6. The park-lock device of claim 1, further comprising a secondary shaft;
    wherein at least a portion of the secondary shaft is disposed within the gearbox casing and is connected for rotation with the gearwheel of the park-lock device.

7. The park-lock device of claim 6, wherein the second axis of rotation of the shaft is parallel to the axis of rotation of the secondary shaft.

8. The park-lock device of claim 1, wherein the tilting lever has one or more cam receiving portions extending inward into a body portion of the tilting lever; and
    wherein the one or more cam receiving portions of the tilting lever have a size and shape to receive and/or retain at least a portion of the cam therein.

9. The park-lock device of claim 1, wherein the cam comprises a spring receiving portion having a size and shape to receive and/or retain at least a portion of an end of a spring therein; and
    wherein the spring receiving portion of the cam is interposed between the first tilting lever receiving portion and the second tilting lever receiving portion of the cam.

10. The park-lock device of claim 1, wherein the cam comprises a spring receiving portion having a size and shape to receive and/or retain at least a portion of an end of a spring therein.

11. The park-lock device of claim 1, wherein the cam has one or more radial cavities extending inward from at least a portion of an inner surface of the cam;
    wherein the one or more radial cavities in the inner surface of the cam are of a size and shape to receive and/or retain at least a portion of one or more radial protrusions extending outward from at least a portion of an outer surface of the shaft; and wherein the width of the one or more radial protrusions of the shaft are smaller than the width of the one or more radial cavities of the cam.

12. The park-lock device of claim 11, wherein the cam is able to rotate a pre-determined amount relative to the shaft.

13. The park-lock device of claim 1, further comprising an abutment member having one or more spline couplings extending inward from an inner surface thereof;
   wherein the one or more spline couplings in the abutment member are of a size and shape to receive and/or retain at least a portion of one or more radial protrusions extending outward from at least a portion of an outer surface of the shaft; and
   wherein the abutment member provides positional feedback control for the rotary actuator.

14. The park-lock of claim 13, wherein at least a portion of an end of a spring is connected to the cam and at least a portion of an opposite end of the spring is connected to the abutment member.

15. The park-lock of claim 13, wherein at least a portion of the abutment member is interposed between the cam and the rotary actuator.

16. The park-lock device of claim 1, further comprising a control unit for controlling the tilting movement of the tilting lever between the disengagement position and the engagement position.

17. The park-lock device of claim 1, further comprising a spring configured to selectively apply amount of torque on the cam.

18. The park-lock device of claim 1, wherein the spring is a cylindrical helical flexion spring.

19. The park-lock device of claim 1, wherein the first axis of rotation is substantially parallel to the second axis of rotation.

20. The park-lock device of claim 1, wherein the cam has a first lateral surface portion configured to cooperate with the first cam follower of the tilting lever and a second lateral surface portion configured to cooperate with the second cam follower of the tilting lever.

* * * * *